D. H. MOORE.
VEHICLE TIRE.
APPLICATION FILED MAY 10, 1917.
1,253,271. Patented Jan. 15, 1918.
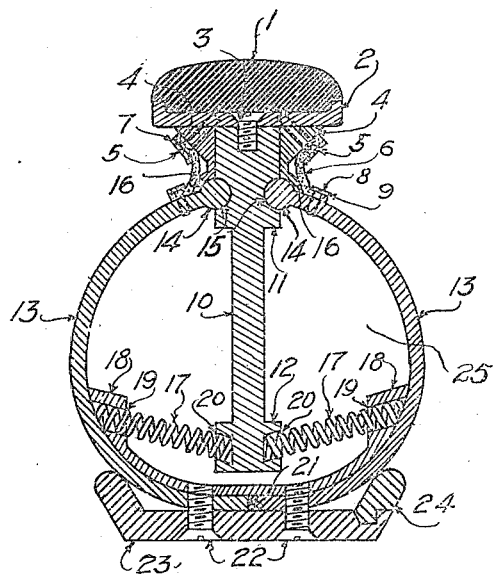
WITNESSES
N. A. Lago
Edward Henderson
INVENTOR
David H. Moore,
BY
ATTORNEY

UNITED STATES PATENT OFFICE.

DAVID H. MOORE, OF OKLAHOMA, OKLAHOMA.

VEHICLE-TIRE.

1,253,271.

Specification of Letters Patent.   Patented Jan. 15, 1918.

Application filed May 10, 1917.   Serial No. 167,796.

*To all whom it may concern:*

Be it known that I, DAVID H. MOORE, a citizen of the United States, residing at Oklahoma city, in the county of Oklahoma and State of Oklahoma, have invented a Vehicle-Tire, of which the following is a specification.

My invention relates to certain new and useful improvements in vehicle tires, the object being to provide a resilient tire formed of spring metal with a tread of rubber or other material, whereby a tire is formed which will have the resilient powers of a pneumatic tire.

A further object of my invention is to provide a tire which is so constructed that it can readily be used in connection with any of the well-known makes of wheels using a clencher rim, thus enabling the tire to be readily attached to those wheels.

Another object of my invention is to provide a tire which is formed of a plurality of resilient ring sections made of a flexible material, preferably metal, so connected together that they will be held in their proper positions without any danger of the sections becoming detached from one another or from the rim of the wheel. The outer portions of the said sections forming a tubular casing, within which is disposed a metal supporting member, separated from the said casing sections by strong springs to provide substantial resiliency, which together with an elastic tread, serves to cushion vibration and deaden noise.

With these and other objects in view, reference is to be had to the accompanying drawing constituting a part of this specification, in which similar characters of reference denote corresponding parts and in which the figure is a transverse radial sectional view of the structure of the tire.

Referring more particularly to the figure, I provide a solid rubber, leather or fabric tire tread 1, attached to the tire tread channel 2 by any suitable means, the said tire channel 2 being firmly secured to the outer flange, 11 of the inner supporting member 10, by means of the screws 3. On the under side of the tire channel 2 are the triangular bands 4 with their flanges or lower edges 16 partly inclosing the enlarged circular outer edges 14 of the outer casing sections 13. Screws 5 extend through the thin metal strips 7, the rubber fabric strips 6, the triangular bands 4 and into the tire tread channel 2, thus securely bracing the said tire tread channel 2 and securing the outer edges of the said rubber fabric strips 6. Within the tube 25 formed by the outer casing sections 13, is disposed the inner supporting member 10, I shaped in cross section, the outer flange 11 of the said inner supporting member 10 having a semi-circular groove or channel 15 cut in each side of the said outer flange 11, to receive the enlarged circular edges 14 of the said outer casing sections 13. The inner edge of each rubber fabric strip 6 is secured to the outer casing 13 adjacent to the enlarged circular edge 14 of the said outer casing 13 by means of a thin metal strip 9 and screws 8, the said rubber fabric strip 6 being so secured to prevent the entrance of dust, mud or water into the tube 25. Disposed within the lower part of the tube 25 is a flattened U shaped member 18, the upper edges of the said U shaped member being enlarged to accommodate the holes 19, the springs 17 being forced through the said holes 19 and into the holes 20 in the inner flange of the inner supporting member 10, the said springs 17, being held in place by the outer casing sections 13, absorbs all shock due to side thrust upon the tire tread 1 and the tire tread channel 2. The outer casing sections 13 meet above the center of the rim 23 at 21 and are securely fastened to the said rim 23 and the flattened U shaped member 18 by the screws 22. The rim 23 is provided with one fixed flange 23 and one movable flange 24, for holding and adjusting the outer casings 13. The enlarged circular outer edges 14 of the outer casing sections 13, fit into the semicircular grooves or channels 15 in the sides of the outer flange 11 of the inner supporting member 10, and each of the said enlarged circular outer edges 14 is securely held in place by the flange or lower edge 16 of the triangular band 4. Should it be necessary to replace the springs 17 at any time, access may be had to the tube 25 by removing the screws 5 near the periphery of the tire, the movable flange 24 of the rim 23 and the screws 22 through the said rim 23.

Having thus described my invention, what I claim as new and desire to secure by Letters Patent is:

A resilient tire composed of a pair of semicircular steel outer casing sections forming an inclosed tube, disposed within the said tube an inner supporting member, having an I shaped cross-section, the outer flange of the said inner supporting member having semi-circular grooves or channels to receive the enlarged circular outer edges of the said outer casing sections, triangular bands each having a flange partly inclosing the said enlarged circular edge of the said outer casing sections, a flattened U shaped member positioned within the lower part of the said inclosed tube, the said U shaped member being provided with holes through which are forced strong expansible springs, the inner ends of the said springs fitting into holes in the inner flange of the said inner supporting member, screws securing the said flattened U shaped member, the said semi-circular outer casing sections and the rim firmly together, a fixed flange and a movable flange on the said rim for holding the said outer casing sections in place.

In testimony whereof I affix my signature in the presence of two witnesses.

DAVID H. MOORE.

Witnesses:
J. C. POWERS, Jr.,
N. A. LAGO.

Copies of this patent may be obtained for five cents each, by addressing the "Commissioner of Patents, Washington, D. C."